United States Patent
Yen (10) Patent No.: US 12,355,282 B2
(45) Date of Patent: Jul. 8, 2025

(54) SMART BATTERY DEVICE, AND ELECTRONIC DEVICE THEREOF

(71) Applicant: Quanta Computer Inc., Taoyuan (TW)

(72) Inventor: Wei-Ting Yen, Taoyuan (TW)

(73) Assignee: QUANTA COMPUTER INC., Taoyuan (TW)

( * ) Notice: Subject to any disclaimer, the term of this patent is extended or adjusted under 35 U.S.C. 154(b) by 404 days.

(21) Appl. No.: 17/492,090

(22) Filed: Oct. 1, 2021

(65) Prior Publication Data

US 2023/0022867 A1    Jan. 26, 2023

(30) Foreign Application Priority Data

Jul. 19, 2021   (TW) .................................. 110126359

(51) Int. Cl.
   *H02J 7/00*   (2006.01)
(52) U.S. Cl.
   CPC .......... *H02J 7/0029* (2013.01); *H02J 7/0047* (2013.01)
(58) Field of Classification Search
   CPC .................................................... H02J 7/0026
   See application file for complete search history.

(56) References Cited

U.S. PATENT DOCUMENTS

2003/0201755 A1* 10/2003 Briggs .................. G06F 1/1626
                                                            320/135
2013/0162219 A1   6/2013 Huang et al.
2017/0269659 A1*  9/2017 Chen ..................... G06F 1/263
2018/0069410 A1*  3/2018 Yen ........................ H02J 7/00

FOREIGN PATENT DOCUMENTS

JP         2001045670 A  *  2/2001  ............ H02J 7/0021

OTHER PUBLICATIONS

JP-2001045670 translation, Hibi, Battery Pack (Year: 2001).*
Japanese language office action dated Feb. 21, 2023, issued in application No. JP 2021-209041.

* cited by examiner

*Primary Examiner* — Tynese V Mcdaniel
(74) *Attorney, Agent, or Firm* — McClure, Qualey & Rodack, LLP (57) ABSTRACT

A battery device includes a battery cell and a battery protection circuit. The battery protection circuit includes a microcontroller and a power-supply switch. The microcontroller receives a start signal, a repair signal, and an external-power-indication signal from the outside of the battery device. The power-supply switch is electrically connected to the battery cell. The microcontroller correspondingly outputs an enable signal to the power-supply switch according to the start signal and the repair signal, so that the power-supply switch disconnects the electrical connection between the battery cell and the battery protection circuit. The microcontroller correspondingly outputs a disable signal to the power-supply switch according to the start signal, the repair signal, and the external-power-indication signal, so that the power-supply switch restores the electrical connection between the battery cell and the battery protection circuit.

7 Claims, 5 Drawing Sheets

SMART BATTERY DEVICE, AND ELECTRONIC DEVICE THEREOF

CROSS REFERENCE TO RELATED APPLICATIONS

This application claims priority of and the benefit of Taiwan Application No. 110126359, filed on Jul. 19, 2021, the entirety of which is incorporated by reference herein.

FIELD OF THE DISCLOSURE

The present invention is related to an electronic device, and in particular it is related to a battery device and an electronic device that includes the battery device.

DESCRIPTION OF THE RELATED ART

Regardless of where a lithium battery is used, whether that be in 3C, an electric vehicle (EV), an energy storage system (ESS), or some information technology (IT) application, the lithium battery will definitely encounter a situation that requires maintenance. It must be completely powered down during maintenance. The current power-off mechanism is that the system seems to be out of power, but as long as there is communication information, there is still electricity.

There are electric cores in the battery pack which are always charged, and the battery pack is connected to the motherboard end, and always has electricity to output to the motherboard. Therefore, unless the battery itself disconnects the electric cores, even if the battery pack enters the protection mode (such as temperature protection, over-voltage protection, etc.), the battery pack may be powered on again, which may cause a short-circuit.

BRIEF SUMMARY OF THE DISCLOSURE

In order to resolve the issue described above, the present invention provides a battery device. The battery device includes a battery cell and a battery protection circuit. The battery protection circuit includes a microcontroller and a power-supply switch. The microcontroller receives a start signal, a repair signal, and an external-power-indication signal from the outside of the battery device. The power-supply switch is electrically connected to the battery cell. The microcontroller correspondingly outputs an enable signal to the power-supply switch according to the start signal and the repair signal, so that the power-supply switch disconnects the electrical connection between the battery cell and the battery protection circuit. The microcontroller correspondingly outputs a disable signal to the power-supply switch according to the start signal, the repair signal, and the external-power-indication signal, so that the power-supply switch restores the electrical connection between the battery cell and the battery protection circuit.

According to the battery device above, the start signal indicates that a power button of an electronic device including the battery device has been pressed. The repair signal indicates that a repair button of the electronic device including the battery device has been pressed. The external-power-indication signal indicates that the electronic device including the battery device has been electrically connected to an external power source.

According to the battery device above, when the microcontroller simultaneously receives the start signal and the repair signal for a period that is less than or equal to a specific duration, the microcontroller outputs the enable signal to the power-supply switch, so that the electrical connection between the battery cell and the battery protection circuit is disconnected, and the battery device enters a repair mode.

According to the battery device above, when the battery device has entered the repair mode and an external power source is electrically connected to the battery device, the external power source supplies power directly to the microcontroller, so that the microcontroller is awakened to receive the external-power-indication signal.

According to the battery device above, when the microcontroller simultaneously receives the start signal and the repair signal for a period that is less than or equal to a specific duration, and the microcontroller also receives the external-power-indication signal, the microcontroller outputs the disable signal to the power-supply switch, so that the electrical connection between the battery cell and the battery protection circuit is restored, and the battery device enters a normal mode.

The present invention also provides an electronic device. The electronic device includes a charging circuit, a power management circuit, a processor, and a battery device. The charging circuit receives a start signal and correspondingly outputting the start signal. When an external power source is electrically coupled to the charging circuit, the charging circuit correspondingly outputs an external-power-indication signal. The power management circuit receives a repair-indication signal and correspondingly outputting the repair-indication signal. The processor outputs a repair signal according to the repair-indication signal. The battery device includes a battery cell and a battery protection circuit. The battery protection circuit receives the start signal, the repair signal, and the external-power-indication signal, and is electrically connected to the battery cell. The battery protection circuit correspondingly disconnects the electrical connection between itself and the battery cell according to the start signal and the repair signal. The battery protection circuit correspondingly restores the electrical connection between itself and the battery cell according to the start signal, the repair signal, and the external-power-indication signal According to the electronic device above, the battery protection circuit includes a microcontroller and a power-supply switch. The microcontroller receives the start signal, the repair signal, and the external-power-indication signal. The power-supply switch is electrically connected to the battery cell. The microcontroller correspondingly outputs an enable signal to the power-supply switch according to the start signal and the repair signal, so that the power-supply switch disconnects the electrical connection between the battery cell and the battery protection circuit. The microcontroller correspondingly outputs a disable signal to the power-supply switch according to the start signal, the repair signal, and the external-power-indication signal, so that the power-supply switch restores the electrical connection between the battery cell and the battery protection circuit.

According to the electronic device above, the start signal indicates that a power button of an electronic device comprising the battery device has been pressed; and the repair signal indicates that a repair button of the electronic device comprising the battery device has been pressed.

According to the electronic device above, when the microcontroller simultaneously receives the start signal and the repair signal for a period that is less than or equal to a specific duration, the microcontroller outputs the enable signal to the power-supply switch, so that the electrical connection between the battery cell and the battery protection circuit is disconnected, and the battery device enters a repair mode.

According to the electronic device above, when the battery device has entered the repair mode and an external power source is electrically coupled to the charging circuit, the charging circuit supplies power and outputs the external-power-indication signal to the microcontroller, so that the microcontroller is awakened to receive the external-power-indication signal.

The present invention also provides a repair method of a battery device, which is suitable for the battery device having a battery cell and a battery protection circuit. The battery device includes a microcontroller and a power-supply switch. The repair method includes receiving a start signal and a repair signal simultaneously for a period that is less than or equal to a specific duration; outputting an enable signal to disconnect the electrical connection between a battery cell and a battery protection circuit; and entering a repair mode.

According to the repair method above, the repair method further includes detecting that an external power source has been electrically connected, and correspondingly outputting an external-power-indication signal in the repair mode; receiving power from the external power source; receiving a start signal and a repair signal simultaneously for a period that is less than or equal to a specific duration; receiving the external-power-indication signal; outputting a disable signal to restore the electrical connection between the battery cell and the battery protection circuit; and entering a normal mode.

According to the repair method above, the start signal indicates that a power button of an electronic device including the battery device has been pressed. The repair signal indicates that a repair button of the electronic device including the battery device has been pressed.

BRIEF DESCRIPTION OF THE DRAWINGS

The disclosure can be more fully understood by reading the subsequent detailed description with references made to the accompanying figures. It should be understood that the figures are not drawn to scale in accordance with standard practice in the industry. In fact, it is allowed to arbitrarily enlarge or reduce the size of components for clear illustration. This means that many special details, relationships and methods are disclosed to provide a complete understanding of the disclosure.

DETAILED DESCRIPTION OF THE DISCLOSURE

Certain words are used to refer to specific elements in the specification and the claims. Those with ordinary knowledge in the technical field should understand that hardware manufacturers may use different terms to refer to the same component. The specification and the claims of the present invention do not use differences in names as a way to distinguish elements, but use differences in functions of elements as a criterion for distinguishing. The "comprise" and "include" mentioned in the entire specification and the claims are open-ended terms, so they should be interpreted as "including but not limited to". "Generally" means that within an acceptable error range, a person with ordinary knowledge in the technical field can solve the technical problem within a certain error range, and basically achieve the technical effect. In addition, the term "coupled" herein includes any direct and indirect electrical connection means. Therefore, if it is described in the text that a first device is coupled to a second device, it means that the first device can be directly electrically connected to the second device, or indirectly electrically connected to the second device through other devices or connecting means. The following descriptions are preferred ways to implement the present invention. The purpose is to illustrate the spirit of the present invention and not to limit the scope of protection of the present invention.

The following description is the best embodiment expected of the present invention. These descriptions are used to illustrate the general principles of the present invention and should not be used to limit the present invention. The protection scope of the present invention should be determined on the basis of referring to the scope of the claims of the present invention.

Figure 1:
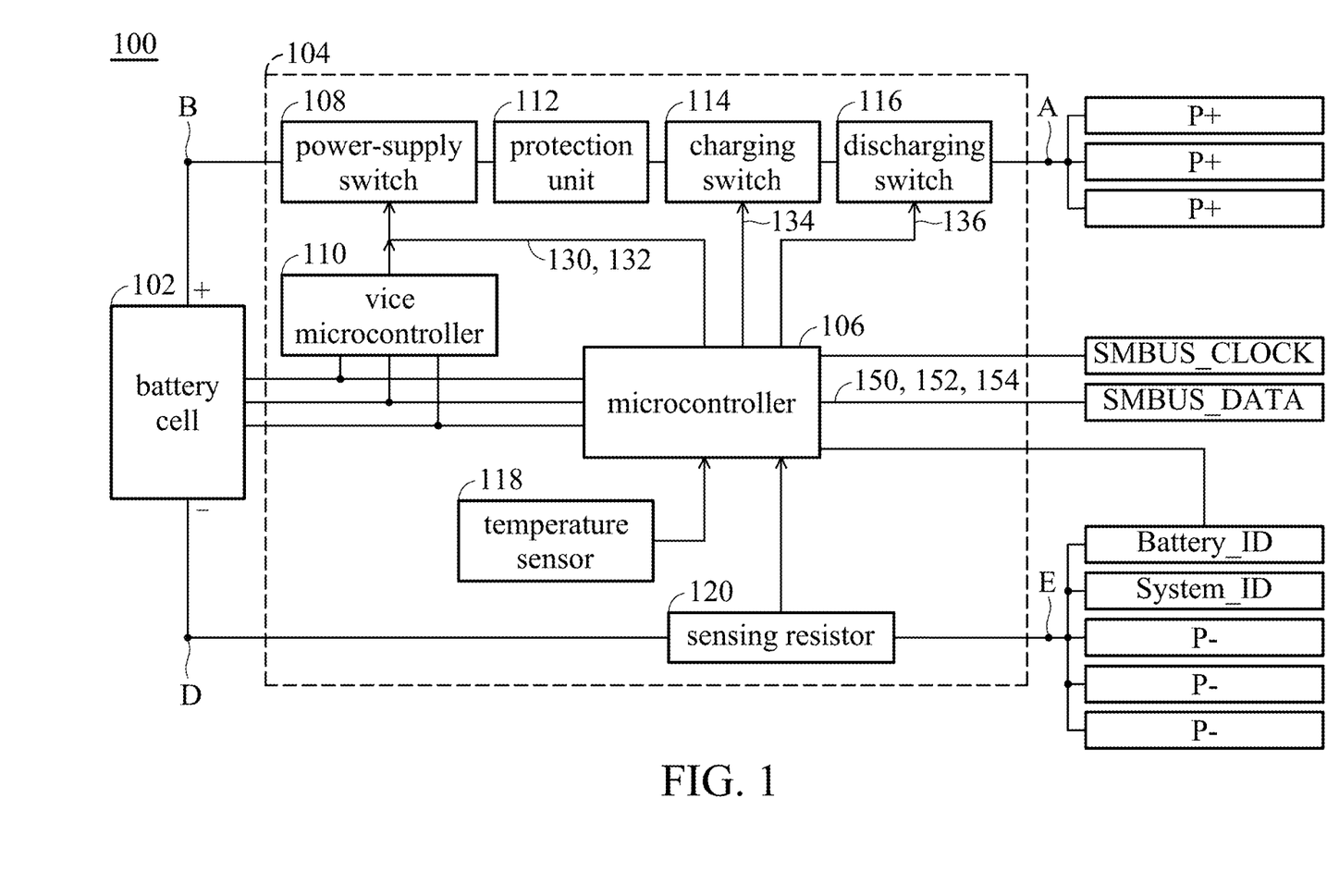
FIG. 1 is a schematic diagram of a battery device 100 in accordance with some embodiments of the present invention.

FIG. 1 is a schematic diagram of a battery device 100 in accordance with some embodiments of the present invention. As shown in FIG. 1, the battery device 100 includes a battery cell 102 and a battery protection circuit 104. The battery cell 102 can convert the received electrical energy into chemical energy for storage, or convert the stored chemical energy into electrical energy for output, and output the electrical energy to the battery protection circuit 104. The battery protection circuit 104 can control the electrical energy from the battery cell 102 to be output through a positive pole P+ of the battery device 100 and flow back to the battery cell 102 from a negative pole P− of the battery device 100. Alternatively, the battery protection circuit 104 can control an external power source (not shown) outside the battery device 100 to charge the battery cell 102.

In some embodiments, the battery protection circuit 104 includes a microcontroller 106, a power-supply switch 108, a vice microcontroller 110, a protection unit 112, a charging switch 114, a discharging switch 116, a temperature sensor 118, and a sensing resistor 120. The microcontroller 106 receives a start signal 150, a repair signal 152, and an external-power-indication signal 154 from the outside of the battery device 100 through communication buses SMBUS_DATA and SMBUS_CLOCK. In other words, the battery device 100 can communicate with the processor of the electronic device including the battery device 100 through the communication buses SMBUS_DATA and SMBUS_CLOCK.

The power-supply switch 108 is electrically connected to the battery cell 102. In some embodiments, the microcontroller 106 correspondingly outputs an enable signal 130 to the power-supply switch 108 according to the start signal 150 and the repair signal 152, so that the power-supply switch disconnects the electrical connection between the battery cell 102 and the battery protection circuit 104. In detail, when the microcontroller 106 simultaneously receives the start signal 150 and the repair signal 152 for a period that is less than or equal to a specific duration (for example, 5 seconds), the microcontroller 106 outputs the enable signal 130 to the power-supply switch 108, so that the electrical connection between the battery cell 102 and the battery protection circuit 104 is disconnected, and the battery device 100 enters a repair mode.

In some embodiments, the microcontroller 106 correspondingly outputs a disable signal 132 to the power-supply switch 108 according to the start signal 150, the repair signal 152, and the external-power-indication signal 154, so that the power-supply switch 108 restores the electrical connection between the battery cell 102 and the battery protection circuit 104. In detail, when the battery device 100 has entered the repair mode and an external power source is electrically connected to the battery device 100, the external power source supplies power directly to the microcontroller 106 (through the positive pole P+), so that the microcontroller 106 is awakened to receive the external-power-indication signal 154.

When the microcontroller 106 simultaneously receives the start signal 150 and the repair signal 152 for a period that is less than or equal to a specific duration (for example, 5 seconds), and the microcontroller 106 also receives the external-power-indication signal 154, the microcontroller 106 outputs the disable signal 132 to the power-supply switch 108, so that the electrical connection between the battery cell 102 and the battery protection circuit 104 is restored, and the battery device 100 enters a normal mode.

In some embodiments, the start signal 150 indicates that a power button of an electronic device including the battery device 100 has been pressed. The repair signal 152 indicates that a repair button of the electronic device including the battery device 100 has been pressed. The external-power-indication signal 154 indicates that the electronic device including the battery device 100 has been electrically connected to an external power source. In some embodiments, the protection unit 112 is used to automatically cut off the coupling between the nodes A and B when a large current occurs between the nodes A and B, so as to protect the battery cell 102.

The charging switch 114 changes its status according to the control signal sent by the microcontroller 106 through the control line 134. For example, when the control signal of the control line 134 is at a logic low level, such as "0", the charging switch 114 only allows current to flow from node B to node A, but prohibits current from flowing from node A to node B. When the control signal of the control line 134 is at a logic high level, such as "0", the charging switch 114 is in a fully conductive status.

In some embodiments, the discharging switch 116 changes its status according to the control signal sent by the microcontroller 106 through the control line 136. For example, when the control signal of the control line 136 is at the logic low level, such as "0", the discharging switch 116 only allows current to flow from node A to node B, but prohibits current from flowing from node B to node A. When the control signal of the control line 136 is at the logic high level, the discharging switch 116 is in the fully conductive status.

The temperature sensor 118 is used to detect a temperature of the battery device 100. In some embodiments, the temperature sensor 118 is a temperature sensor chip. In some embodiments, the temperature sensor 118 includes a thermistor whose resistance changes with temperature. The temperature sensor 118 provides power to the thermistor, and converts the change in a cross voltage (corresponding to the change in resistance) into the change in temperature by measuring the cross voltage across the thermistor.

In some embodiments, the microcontroller 106 can measure the cross voltage across the two ends of the sensing resistor 120 (for example, the voltage across nodes D and E) to calculate the magnitude of a charging current in the charging mode. In some embodiments, the processor of the electronic device including the battery device 100 can detect that the battery device 100 has been installed in the electronic device through the battery identification indicators BATTERT_ID and SYSTEM_ID of the battery device 100. In some embodiments, the vice microcontroller 110 is a backup microcontroller of the microcontroller 106. When the microcontroller 106 is unable to operate, the vice microcontroller 110 performs the actions of the microcontroller 106.

Figure 2:
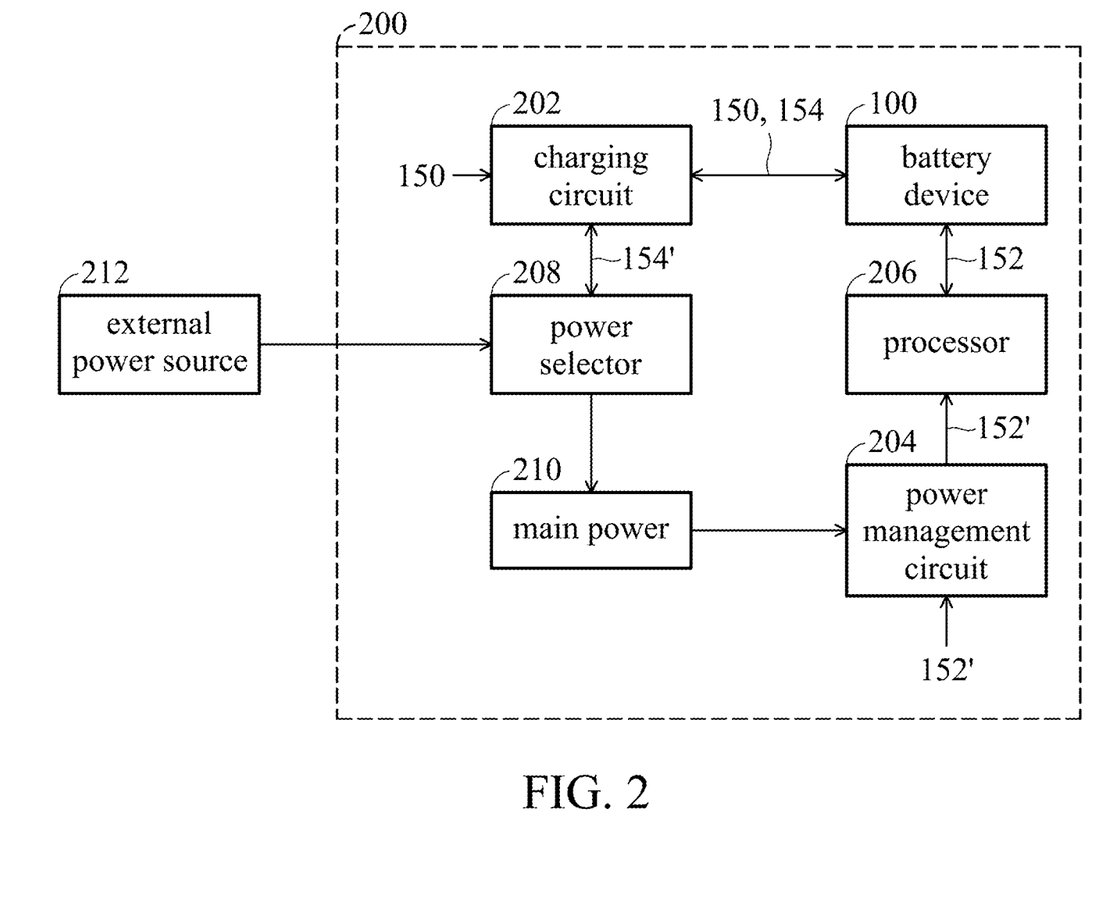
FIG. 2 is a schematic diagram of an electronic device 200 including the battery device 100 in FIG. 1 in accordance with some embodiments of the present invention.

FIG. 2 is a schematic diagram of an electronic device 200 including the battery device 100 in FIG. 1 in accordance with some embodiments of the present invention. As shown in FIG. 2, the electronic device 200 includes the battery device 100 in FIG. 1, a charging circuit 202, a power management circuit 204, a processor 206, a power selector 208, and a main power 210. When the external power source 212 is electrically connected to the electronic device 200, the external power source 212 charges the battery device 100. In some embodiments, the charging circuit 202 receives a start signal 150 and correspondingly outputs the start signal 150 to the battery device 100. When the external power source 212 is electrically coupled to the charging circuit 202 (for example, through the power selector 208), the charging circuit 202 correspondingly outputs an external-power-indication signal 154 to the battery device 100.

In some embodiments, the start signal 150 indicates that a power button (not shown) of the electronic device 200 has been pressed. The power management circuit 204 receives a repair-indication signal 152', and correspondingly outputs the repair-indication signal 152' to the processor 206. Then, the processor 206 correspondingly outputs a repair signal 152 to the battery device 100 according to the repair-indication signal 152'. In some embodiments, the repair signal 152 and the repair-indication signal 152' are used to indicate that a repair button (not shown) of the electronic device 200 has been pressed.

In some embodiments, when the external power source 212 is electrically connected to the electronic device 200, the power selector 208 detects that the external power source 212 has been connected, and correspondingly sends an external-power-indication signal 154' to the charging circuit 202. After the charging circuit 202 receives the external-power-indication signal 154' from the power selector 208, the charging circuit 202 correspondingly sends the external-power-indication signal 154 to the battery device 100. In addition, when the power selector 208 detects that the external power source 212 is electrically connected, the power selector 208 sends the power from the external power source 212 to the main power 210. Then, the main power 210 sends power to the power management circuit 204, so that the power management circuit 204 can supply power to the processor 206.

When the external power source 212 is not electrically connected to the electronic device 200, the power selector 208 does not detect the external power source 212, and the power selector 208 sends power from the battery device 100 to the main power 210. Then, the main power 210 sends power to the power management circuit 204, so that the power management circuit 204 can supply power to the processor 206. In some embodiments, the battery device 100 includes a battery cell (for example, the battery cell 102 in FIG. 1) and a battery protection circuit (for example, the battery protection circuit 104 in FIG. 1). The battery cell is electronically connected to the battery protection circuit.

The battery protection circuit of the battery device 100 receives the start signal 150, the repair signal 152, and the external-power-indication signal 154. The battery protection circuit of the battery device 100 correspondingly disconnects the electrical connection between itself and the battery cell according to the start signal 150 and the repair signal 152. The battery protection circuit of the battery device 100 correspondingly restores the electrical connection between itself and the battery cell according to the start signal 150, the repair signal 152, and the external-power-indication signal 154.

In some embodiments, the battery protection circuit (for example, the battery protection circuit 104) of the battery device 100 includes a microcontroller (for example, the microcontroller 106 in FIG. 1) and a power-supply switch (for example, the power-supply switch 108 in FIG. 1). The microcontroller of the batter protection circuit receives the start signal 150, the repair signal 152, and the external-power-indication signal 154. The power-supply switch of the battery protection circuit is electrically connected to the battery cell of the battery device 100.

In detail, the microcontroller of the battery protection circuit correspondingly outputs an enable signal (for example, the enable signal 130 in FIG. 1) to the power-supply switch according to the start signal 150 and the repair signal 152, so that the power-supply switch disconnects the electrical connection between the battery cell and the battery protection circuit. The microcontroller of the battery protection circuit correspondingly outputs a disable signal (for example, the disable signal 132 in FIG. 1) to the power-supply switch according to the start signal 150, the repair signal 152, and the external-power-indication signal 154, so that the power-supply switch restores the electrical connection between the battery cell and the battery protection circuit.

In some embodiments, when the microcontroller (for example, the microcontroller 106 in FIG. 1) simultaneously receives the start signal 150 and the repair signal 152 for a period that is less than or equal to a specific duration (for example, 5 seconds), the microcontroller outputs the enable signal (for example, the enable signal 130) to the power-supply switch (for example, the power-supply switch 108), so that the electrical connection between the battery cell (for example, the battery cell 102) and the battery protection circuit (for example, the battery protection circuit 104) is disconnected, and the battery device 100 enters a repair mode.

In some embodiments, after the battery device 100 in FIG. 1 and the battery device 100 of the electronic device 200 in FIG. 2 enter the repair mode, a certain time (for example, 5 minutes) must elapse before they enter the normal mode according to the start signal 150, the repair signal 152, and the external-power-indication signal 154, which is used to prevent the battery device 100 from being frequently switched between the repair mode and the normal mode.

In some embodiments, when the battery device 100 has entered the repair mode and the external power source 212 is electrically coupled to the charging circuit 202, the charging circuit 202 supplies power and outputs the external-power-indication signal 154 to the microcontroller of the battery device 100, so that the microcontroller is awakened to receive the external-power-indication signal 154. When the microcontroller of the battery device 100 simultaneously receives the start signal 150 and the repair signal 152 for a period that is less than or equal to a specific duration (for example, 5 seconds), and the microcontroller of the battery device 100 also receives the external-power-indication signal 154, the microcontroller of the battery device 100 outputs a disable signal (for example, the disable signal 132) to the power-supply switch of the battery device 100, so that the electrical connection between the battery cell 102 and the battery protection circuit 104 is restored, and the battery device 100 enters a normal mode.

Figure 3A:
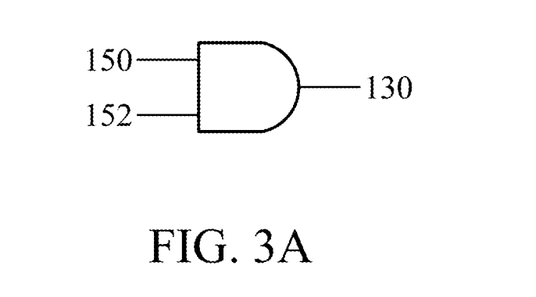
FIG. 3A is a schematic diagram of the logic judgement of entering a repair mode by the battery device 100 in FIG. 1 in accordance with some embodiments of the present invention.

FIG. 3A is a schematic diagram of the logic judgement of entering a repair mode by the battery device 100 in FIG. 1 in accordance with some embodiments of the present invention. As shown in FIG. 3A, when the microcontroller 106 in FIG. 1 receives the start signal 150 from the charging circuit 202 in FIG. 2 and the repair signal 152 from the processor 206 in FIG. 2, the microcontroller 106 performs an AND calculation on the start signal 150 and the repair signal 152, and outputs the result of the AND calculation as the enable signal 130. Table 1 is the truth table of the start signal 150, the repair signal 152, and the enable signal 130.

TABLE 1

| start signal 150 | repair signal 152 | enable signal 130 |
| --- | --- | --- |
| 0 | 0 | 0 |
| 0 | 1 | 0 |
| 1 | 0 | 0 |
| 1 | 1 | 1 |

In other words, only when the microcontroller 106 simultaneously receives the start signal 150 and the repair signal 152 for a period that is less than or equal to a specific duration (for example, 5 seconds), the microcontroller 106 correspondingly the enable signal 130 to the power-supply switch 108. In some embodiments, simultaneously receiving the start signal 150 and the repair signal 152 by the microcontroller 106 means that the microcontroller 106 simultaneously receives the start signal 150 at the logic low level and the repair signal 152 at the logic low level, but the present invention is not limited thereto.

Figure 3B:
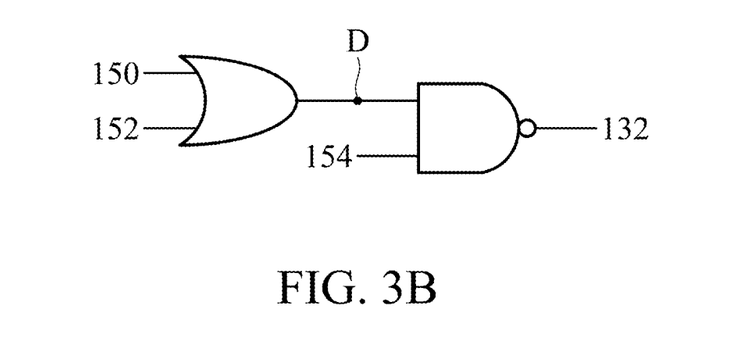
FIG. 3B is a schematic diagram of the logic judgement of returning back to a normal mode by the battery device 100 in FIG. 1 in accordance with some embodiments of the present invention.

FIG. 3B is a schematic diagram of the logic judgement of returning back to a normal mode by the battery device 100 in FIG. 1 in accordance with some embodiments of the present invention. As shown in FIG. 3B, when the battery device 100 has been in the repair mode, and the microcontroller 106 simultaneously receives the start signal 150, the repair signal 152, and the external-power-indication signal 154, the microcontroller 106 performs an OR calculation on the start signal 150 and the repair signal 152 to obtain the calculation result of the output terminal D, and then performs a NAND calculation on the calculation result of the output terminal D and the external-power-indication signal 154, and outputs the final calculation result as the disable signal 132. Table 2 (1) and Table 2 (2) are truth tables of the start signal 150, the repair signal 152, the external-power-indication signal 154, and the disable signal 132.

TABLE 2 (1)

| start signal 150 | repair signal 152 | terminal D |
|---|---|---|
| 0 | 0 | 0 |
| 0 | 1 | 1 |
| 1 | 0 | 1 |
| 1 | 1 | 1 |

TABLE 2 (2)

| terminal D | external-power-indication signal 154 | disable signal 132 |
|---|---|---|
| 0 | 0 | 1 |
| 0 | 1 | 1 |
| 1 | 0 | 1 |
| 1 | 1 | 0 |

According to the above Table 2 (1) and Table 2 (2), only when the microcontroller 106 simultaneously receives the start signal 150 and the repair signal 152 for a period that is less than or equal to a specific duration (for example, 5 seconds), and the microcontroller 106 also receives the external-power-indication signal 154, the microcontroller 106 outputs the disable signal 132 to the power-supply switch 108, so that the electrical connection between the battery cell 102 and the battery protection circuit 104 is restored, and the battery device 100 enters a normal mode. In some embodiments, the enable signal 130 and the disable signal 132 are mutually inverted signals.

In some embodiments, simultaneously receiving the start signal 150 and the repair signal 152 by the microcontroller 106 means that the microcontroller 106 simultaneously receives the start signal 150 at the logic low level and the repair signal 152 at the logic low level. Receiving the external-power-indication signal 154 by the microcontroller 106 means that the microcontroller 106 receives the external-power-indication signal 154 at the logic high level, but the present invention is not limited thereto.

Figure 4:
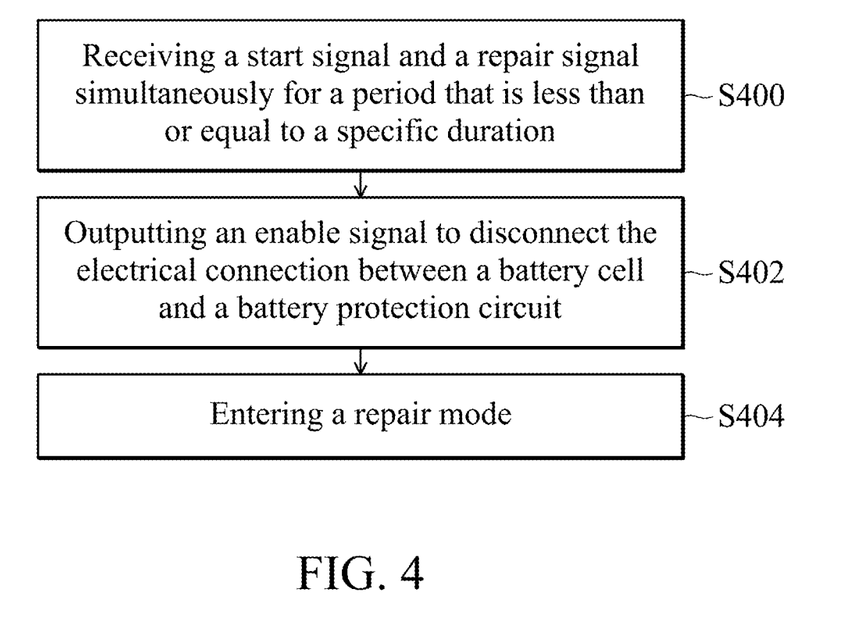
FIG. 4 is a flow chart of a repair method of entering a repair mode for a battery device in accordance with some embodiments of the present invention.

FIG. 4 is a flow chart of a repair method of entering a repair mode for a battery device in accordance with some embodiments of the present invention. As shown in FIG. 4, the repair method of the present invention is suitable a battery device (for example, the battery device 100) having a battery cell (for example, the battery cell 102) and a battery protection circuit (for example, the battery protection circuit 104). The battery device includes a microcontroller (for example, the microcontroller 106) and a power-supply switch (for example, the power-supply switch 108). The repair method includes: receiving a start signal and a repair signal simultaneously for a period that is less than or equal to a specific duration (step S400); outputting an enable signal to disconnect the electrical connection between a battery cell and a battery protection circuit (step S402); and entering a repair mode (step S404). In some embodiments, the microcontroller 106 in FIG. 1 executes steps S400 and S402, so that the battery device 100 in FIGS. 1 and 2 can execute step S404.

Figure 5:
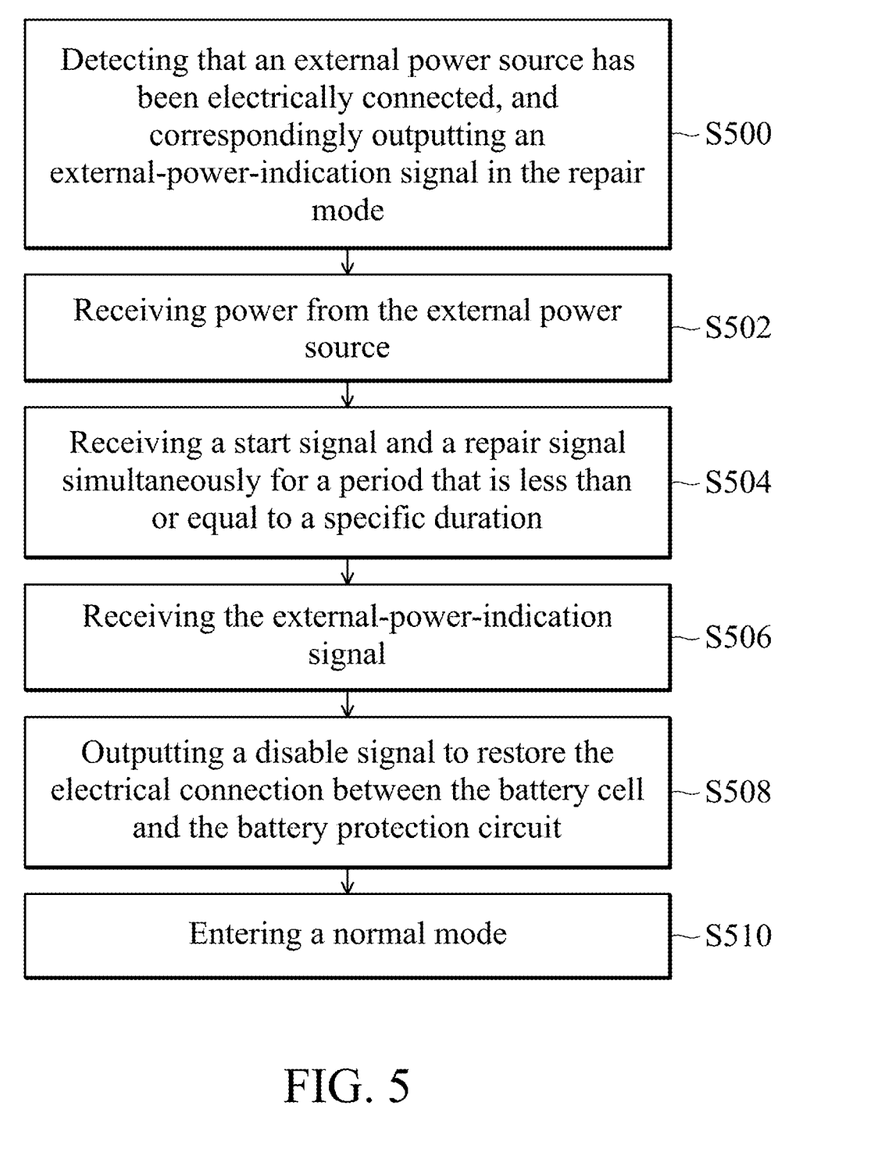
FIG. 5 is a flow chart of a repair method of returning back to a normal mode for a battery device in accordance with some embodiments of the present invention.

FIG. 5 is a flow chart of a repair method of returning back to a normal mode for a battery device in accordance with some embodiments of the present invention. As shown in FIG. 5, the repair method of the present invention includes: detecting that an external power source has been electrically connected, and correspondingly outputting an external-power-indication signal in the repair mode (step S500); receiving power from the external power source (step S502); receiving a start signal and a repair signal simultaneously for a period that is less than or equal to a specific duration (step S504); receiving the external-power-indication signal (step S506); outputting a disable signal to restore the electrical connection between the battery cell and the battery protection circuit (step S508); and entering a normal mode (step S510).

In some embodiments, the charging circuit 202 in FIG. 2 executes step S500. The microcontroller 106 in FIG. 1 executes steps S502, S504, S506 and S508, so that the battery device 100 can execute step S510. In some embodiments, the start signal in step S504 indicates that the power button of the electronic device 200 including the battery device 100 has been pressed. The repair signal in step S504 indicates that the repair button of the electronic device 200 including the battery device 100 has been pressed. The external-power-indication signal in step S506 indicates that the electronic device 200 including the battery device 100 has been electrically connected to the external power source 212.

The battery device 100, the electronic device 200 including the battery device 100, and the repair method thereof of the present invention can not only achieve power-off maintenance and increase maintenance efficiency, but also avoid live working and reduce the possibility of short circuit during maintenance.

In the several embodiments provided by the present invention, it should be understood that the disclosed system, device, and method can be implemented using other methods. The device embodiments described above are merely illustrative, for example, the division of units is only a logical function division, and there may be other divisions in actual implementation. For example, multiple units or elements can be combined or integrated into another system, or some features may be omitted or not implemented. In addition, the displayed or discussed mutual coupling or direct coupling or communicative connecting may be indirect coupling or communicatively connecting through some interfaces, device or units, and may be in electrical, mechanical, or other forms.

In addition, the functional units in the various embodiments of the present invention may be integrated into one processing unit, or each unit may exist alone physically, or two or more units may be integrated into one unit. The above-mentioned integrated unit can be realized either in the form of hardware or in the form of a software functional unit.

Although the present invention is disclosed above in the preferred embodiment, it is not intended to limit the scope of the present invention. Anyone with ordinary knowledge in the relevant technical field can make changes and modifications without departing from the spirit and scope of the present invention. Therefore, the protection scope of the present invention shall be determined by the scope of the claims.

What is claimed is:

1. A battery device, comprising:
   a battery cell, storing electrical energy;
   a battery protection circuit, electrically connected to the battery cell, comprising:
   a microcontroller, receiving a start signal, a repair signal, and an external-power-indication signal from the outside of the battery device; and
   a power-supply switch, electrically connected to the battery cell;

wherein the microcontroller is configured to perform an AND calculation on the start signal and the repair signal to output an enable signal to the power-supply switch, so that the power-supply switch disconnects the electrical connection between the battery cell and the battery protection circuit;

wherein the microcontroller is configured to perform an OR calculation on the start signal and the repair signal to obtain a calculation result, and a NAND calculation on the calculation result and the external-power-indication signal to outputs a disable signal to the power-supply switch, so that the power-supply switch restores the electrical connection between the battery cell and the battery protection circuit;

wherein the start signal indicates that a power button comprised in an electronic device comprising the battery device has been pressed; the repair signal indicates that a repair button comprised in the electronic device comprising the battery device has been pressed; and the external-power-indication signal indicates that the electronic device comprising the battery device has been electrically connected to an external power source.

2. The battery device as claimed in claim 1, wherein when the microcontroller simultaneously receives the start signal and the repair signal for a period that is less than or equal to a specific duration, the microcontroller outputs the enable signal to the power-supply switch, so that the electrical connection between the battery cell and the battery protection circuit is disconnected, and the battery device enters a repair mode.

3. The battery device as claimed in claim 2, wherein when the battery device has entered the repair mode and an external power source is electrically connected to the battery device, the external power source supplies power directly to the microcontroller, so that the microcontroller is awakened to receive the external-power-indication signal.

4. The battery device as claimed in claim 3, wherein when the microcontroller simultaneously receives the start signal and the repair signal for the duration less than or equal to the specific time, and the microcontroller also receives the external-power-indication signal, the microcontroller outputs the disable signal to the power-supply switch, so that the electrical connection between the battery cell and the battery protection circuit is restored, and the battery device enters a normal mode.

5. An electronic device, comprising:
a charging circuit, receiving and passing through a start signal; wherein when an external power source is electrically coupled to the charging circuit, the charging circuit correspondingly outputs an external-power-indication signal;
a power management circuit, receiving passing through a repair-indication signal;
a processor, outputting a repair signal according to the repair-indication signal;
a battery device, comprising a battery cell and a battery protection circuit; wherein the battery protection circuit comprises a microcontroller and a power-supply switch; wherein the microcontroller receives the start signal, the repair signal, and the external-power-indication signal, and the power-supply switch is electrically connected to the battery cell;
wherein the battery protection circuit receives the start signal, the repair signal, and the external-power-indication signal, and is electrically connected to the battery cell;
wherein the battery protection circuit correspondingly disconnects the electrical connection between itself and the battery cell according to the start signal and the repair signal;
wherein the battery protection circuit correspondingly restores the electrical connection between itself and the battery cell according to the start signal, the repair signal, and the external-power-indication signal;
wherein the microcontroller is configured to perform an AND calculation on the start signal and the repair signal to outputs an enable signal to the power-supply switch, so that the power-supply switch disconnects the electrical connection between the battery cell and the battery protection circuit;
wherein the microcontroller is configured to perform an OR calculation on the start signal and the repair signal to obtain a calculation result, and a NAND calculation on the calculation result and the external-power-indication signal to outputs a disable signal to the power-supply switch, so that the power-supply switch restores the electrical connection between the battery cell and the battery protection circuit;
wherein the start signal indicates that a power button comprised in the electronic device comprising the battery device has been pressed to turn on the electronic device to enter a repair mode; and the repair signal indicates that a repair button comprised in the electronic device comprising the battery device has been pressed; and the external-power-indication signal indicates that the electronic device comprising the battery device has been electrically connected to an external power source.

6. The electronic device as claimed in claim 5, wherein when the microcontroller simultaneously receives the start signal and the repair signal for a period that is less than or equal to a specific duration, the microcontroller outputs the enable signal to the power-supply switch, so that the electrical connection between the battery cell and the battery protection circuit is disconnected, and the battery device enters a repair mode.

7. The electronic device as claimed in claim 6, wherein when the battery device has entered the repair mode and an external power source is electrically coupled to the charging circuit, the charging circuit supplies power and outputs the external-power-indication signal to the microcontroller, so that the microcontroller is awakened to receive the external-power-indication signal.

* * * * *